US011428241B2

(12) United States Patent
Schwarz et al.

(10) Patent No.: US 11,428,241 B2
(45) Date of Patent: Aug. 30, 2022

(54) SYSTEM FOR AN IMPROVED STATOR ASSEMBLY

(71) Applicant: United Technologies Corporation, Hartford, CT (US)

(72) Inventors: Frederick M. Schwarz, Glastonbury, CT (US); Jeffrey D. Ponchak, North Berwick, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 1171 days.

(21) Appl. No.: 15/136,416

(22) Filed: Apr. 22, 2016

(65) Prior Publication Data

US 2017/0343011 A1 Nov. 30, 2017

(51) Int. Cl.
*F01D 5/14* (2006.01)
*F04D 29/54* (2006.01)
(Continued)

(52) U.S. Cl.
CPC ........... *F04D 29/544* (2013.01); *F01D 5/141* (2013.01); *F01D 9/041* (2013.01); *F04D 29/083* (2013.01); *F02K 3/06* (2013.01); *F05D 2220/32* (2013.01); *F05D 2240/121* (2013.01); *F05D 2240/122* (2013.01); *Y02T 50/60* (2013.01)

(58) Field of Classification Search
CPC ...... F04D 29/54; F04D 29/541; F04D 29/542; F04D 29/544; F04D 29/083; F01D 9/04; F01D 9/041; F01D 9/042; F01D 5/14; F01D 5/141; F01D 5/148; F05D 2240/11; F05D 2240/121; F05D 2240/122; F05D 2220/32; Y02T 50/673; F02K 3/06

See application file for complete search history.

(56) References Cited

U.S. PATENT DOCUMENTS 3,751,180 A * 8/1973 Cameron ................ F01D 9/041
415/195
4,300,868 A * 11/1981 Wilkinson ............ F01D 11/005
415/137

(Continued)

FOREIGN PATENT DOCUMENTS

EP 1840329 10/2007
FR 3004749 10/2014

(Continued)

OTHER PUBLICATIONS

EP Search Report dated Sep. 19, 2017 in EP Application No. 17167407.0.

(Continued)

*Primary Examiner* — David E Sosnowski
*Assistant Examiner* — Wayne A Lambert
(74) *Attorney, Agent, or Firm* — Snell & Wilmer L.L.P.

(57) ABSTRACT

An improved stator assembly is disclosed. The stator assembly may comprise an exit guide vane, an OD ring, and an ID ring. The exit guide vane may couple at one end to the OD ring and at an opposite end to the ID ring. The exit guide vane may comprise a leading edge opposite of a trailing edge. The OD ring and the ID ring may couple to a diffuser assembly of a gas turbine engine. The stator assembly may further comprise an aft OD seal, a forward OD seal, an ID seal, and a diffuser assembly seal to reduce airflow leaks around the stator assembly.

7 Claims, 4 Drawing Sheets

(51) Int. Cl.
F01D 9/04 (2006.01)
F04D 29/08 (2006.01)
F02K 3/06 (2006.01)

(56) References Cited

U.S. PATENT DOCUMENTS

| | | | | | |
|---|---|---|---|---|---|
| 4,503,668 | A | * | 3/1985 | Duncan, III | F01D 9/042 415/118 |
| 4,621,976 | A | * | 11/1986 | Marshall | F01D 5/24 415/119 |
| 4,720,236 | A | * | 1/1988 | Stevens | F01D 9/042 415/116 |
| 4,809,498 | A | * | 3/1989 | Giffin, III | B64C 11/48 416/129 |
| 4,826,400 | A | * | 5/1989 | Gregory | F01D 5/141 415/181 |
| 4,900,230 | A | * | 2/1990 | Patel | F01D 5/141 415/181 |
| 4,989,406 | A | * | 2/1991 | Vdoviak | F01D 25/162 244/117 A |
| 5,088,892 | A | * | 2/1992 | Weingold | F01D 5/145 415/193 |
| 5,145,316 | A | * | 9/1992 | Birch | F01D 5/225 415/173.1 |
| 5,249,921 | A | * | 10/1993 | Stueber | F04D 29/542 415/138 |
| 5,623,823 | A | * | 4/1997 | Schirle | F02K 3/06 415/144 |
| 6,076,835 | A | * | 6/2000 | Ress | F01D 11/005 277/637 |
| 6,299,412 | B1 | * | 10/2001 | Wood | F01D 5/141 416/223 A |
| 6,364,606 | B1 | * | 4/2002 | Rice | F01D 25/246 415/189 |
| 6,375,419 | B1 | * | 4/2002 | LeJambre | F01D 5/141 415/191 |
| 6,409,471 | B1 | * | 6/2002 | Stow | F01D 11/08 29/888.022 |
| 6,881,032 | B2 | * | 4/2005 | Malmborg | F01D 9/023 415/209.2 |
| 7,073,336 | B2 | * | 7/2006 | Lepretre | F02C 7/28 60/751 |
| 7,195,456 | B2 | * | 3/2007 | Aggarwala | F01D 5/145 415/208.2 |
| 7,204,676 | B2 | * | 4/2007 | Dutton | F01D 5/141 416/238 |
| 7,229,248 | B2 | * | 6/2007 | Ito | F01D 5/141 415/208.1 |
| 7,445,426 | B1 | * | 11/2008 | Matheny | F01D 9/042 415/135 |
| 7,819,622 | B2 | * | 10/2010 | Paulino | F01D 25/246 415/104 |
| 8,087,884 | B2 | * | 1/2012 | Wood | F01D 5/141 415/191 |
| 8,235,658 | B2 | * | 8/2012 | Guemmer | F01D 5/143 415/199.5 |
| 8,696,306 | B2 | * | 4/2014 | Clemen | F01D 5/141 415/144 |
| 8,911,215 | B2 | * | 12/2014 | Cornelius | F01D 5/141 416/242 |
| 9,068,460 | B2 | * | 6/2015 | Suciu | F01D 1/04 |
| 2002/0159880 | A1 | * | 10/2002 | Morris | F01D 5/082 415/1 |
| 2004/0219014 | A1 | * | 11/2004 | Synnott | F02C 7/28 415/209.2 |
| 2004/0239050 | A1 | * | 12/2004 | Antunes | F01D 9/023 277/630 |
| 2005/0095123 | A1 | * | 5/2005 | Taillant | F01D 11/005 415/174.2 |
| 2005/0102994 | A1 | * | 5/2005 | Lepretre | F01D 11/005 60/39.01 |
| 2005/0111969 | A1 | * | 5/2005 | Arness | F01D 9/042 415/189 |
| 2005/0175448 | A1 | * | 8/2005 | Jacobsson | F04D 19/02 415/194 |
| 2006/0062673 | A1 | | 3/2006 | Coign | |
| 2009/0274554 | A1 | * | 11/2009 | Guemmer | F01D 5/143 415/191 |
| 2011/0150660 | A1 | * | 6/2011 | Micheli | F01D 5/141 416/223 R |
| 2013/0089415 | A1 | | 4/2013 | Brown | |
| 2013/0230386 | A1 | * | 9/2013 | Baumann | F01D 11/00 415/170.1 |
| 2014/0241874 | A1 | * | 8/2014 | Rioux | F01D 25/246 415/209.4 |

FOREIGN PATENT DOCUMENTS

| | | |
|---|---|---|
| GB | 2435309 | 8/2007 |
| GB | 2475140 | 5/2011 |

OTHER PUBLICATIONS

European Patent Office, European Office Action dated Jun. 10, 2020 in Application No. 17167407.0.
European Patent Office, European Office Action dated Feb. 1, 2021 in Application No. 17167407.0.

* cited by examiner

SYSTEM FOR AN IMPROVED STATOR ASSEMBLY

FIELD

The present disclosure relates to gas turbine engines, and more specifically, to a system for an improved stator assembly.

BACKGROUND

Gas turbine engines typically include a compressor section to pressurize inflowing air, a combustor section to burn a fuel in the presence of the pressurized air, and a turbine section to extract energy from the resulting combustion gases. The compressor section typically may comprise alternating rows of rotors and stators, ending with an exit guide vane. The exit guide vane may be angled to remove swirl from the inflowing air, before directing air into a diffuser assembly.

SUMMARY

In various embodiments, a stator assembly is disclosed. The stator assembly may comprise an OD ring. The OD ring may have a front edge and an aft edge. The stator assembly may comprise an exit guide vane coupled to the OD ring. The exit guide vane may comprise a leading edge and a trailing edge axially opposite of the leading edge. The exit guide vane may comprise an axis located between the leading edge and the trailing edge. The leading edge may be oriented at an angle of about 44° to about 64° relative to the axis. The trailing edge may be oriented at an angle of about 1° to about 15° relative to the axis. The stator assembly may comprise an ID ring coupled to the exit guide vane. The ID ring may have a front end and an aft end.

In various embodiments, the exit guide vane of the stator assembly may comprise an axial diameter of about 10 inches to about 18 inches. In various embodiments, the stator assembly may further comprise an aft OD seal configured to be located on the aft edge of the OD ring. In various embodiments, the stator assembly may further comprise a forward OD seal. The forward OD seal may comprise a retention feature configured to couple the forward edge of the OD ring. In various embodiments, the OD ring of the stator assembly may comprise an axial diameter of about 9 inches to about 18 inches. In various embodiments, the ID ring may comprise an axial diameter of about 7 inches to about 18 inches.

In various embodiments, an exit guide vane is disclosed. The exit guide vane may comprise a body. The exit guide vane may comprise a leading edge and a trailing edge opposite of the leading edge. The exit guide vane may comprise an axis located between the leading edge and the trailing edge. The leading edge may be oriented at an angle of about 44° to about 64° relative to the axis. The trailing edge may be oriented at an angle of about 1° to about 15° relative to the axis.

In various embodiments, the body of the exit guide vane may comprise an axial diameter of about 10 inches to about 18 inches. In various embodiments, the exit guide vane may further comprise an OD ring coupled to a first end of the body, and an ID ring coupled to a second end of the body. In various embodiments, the exit guide vane may comprise an aft OD seal configured to be located on the aft edge of the OD ring. In various embodiments, the exit guide vane may comprise a forward OD seal. The forward OD seal may comprise a retention feature configured to couple to the forward edge of the OD ring. In various embodiments, the exit guide vane may comprise an ID seal configured to be located on the aft end of the ID ring. In various embodiments, the OD ring may comprise an axial diameter of about 9 inches to about 18 inches. The ID ring may comprise an axial diameter of about 7 inches to about 18 inches.

In various embodiments, a gas turbine engine is disclosed. The gas turbine engine may comprise a compressor section. The gas turbine engine may comprise a diffuser assembly located aft of the compressor section. The gas turbine engine may comprise a stator assembly in the compressor section. The stator assembly may comprise an OD ring coupled adjacent to the diffuser assembly. The stator assembly may comprise at least one exit guide vane coupled to the OD ring. The at least one exit guide vane may comprise a leading edge and a trailing edge axially opposite of the leading edge. The at least one exit guide vane may comprise an axis located between the leading edge and the trailing edge. The leading edge may be oriented at an angle of about 44° to about 64° relative to the axis. The trailing edge may be oriented at an angle of about 1° to about 15° relative to the axis. The stator assembly may comprise an ID ring coupled to the at least one exit guide vane. The ID ring may be coupled to the diffuser assembly radially apart from the OD ring.

In various embodiments, the gas turbine engine may further comprise an aft OD seal located between the coupling of the OD ring and the diffuser assembly. In various embodiments, the gas turbine engine may further comprise a forward OD seal that comprises a retention feature configured to couple the forward OD seal to the OD ring. In various embodiments, the gas turbine engine may further comprise an ID seal located between the coupling of the ID ring and the diffuser assembly. In various embodiments, the gas turbine engine may further comprise a diffuser assembly seal located between a coupling of the diffuser assembly to an aft ring of the gas turbine engine. In various embodiments, the OD ring of the gas turbine engine may comprise an axial diameter of about 9 inches to about 18 inches. The ID ring of the gas turbine engine may comprise an axial diameter of about 7 inches to about 18 inches. The at least one exit guide vane may comprise an axial diameter of about 10 inches to about 18 inches.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1:
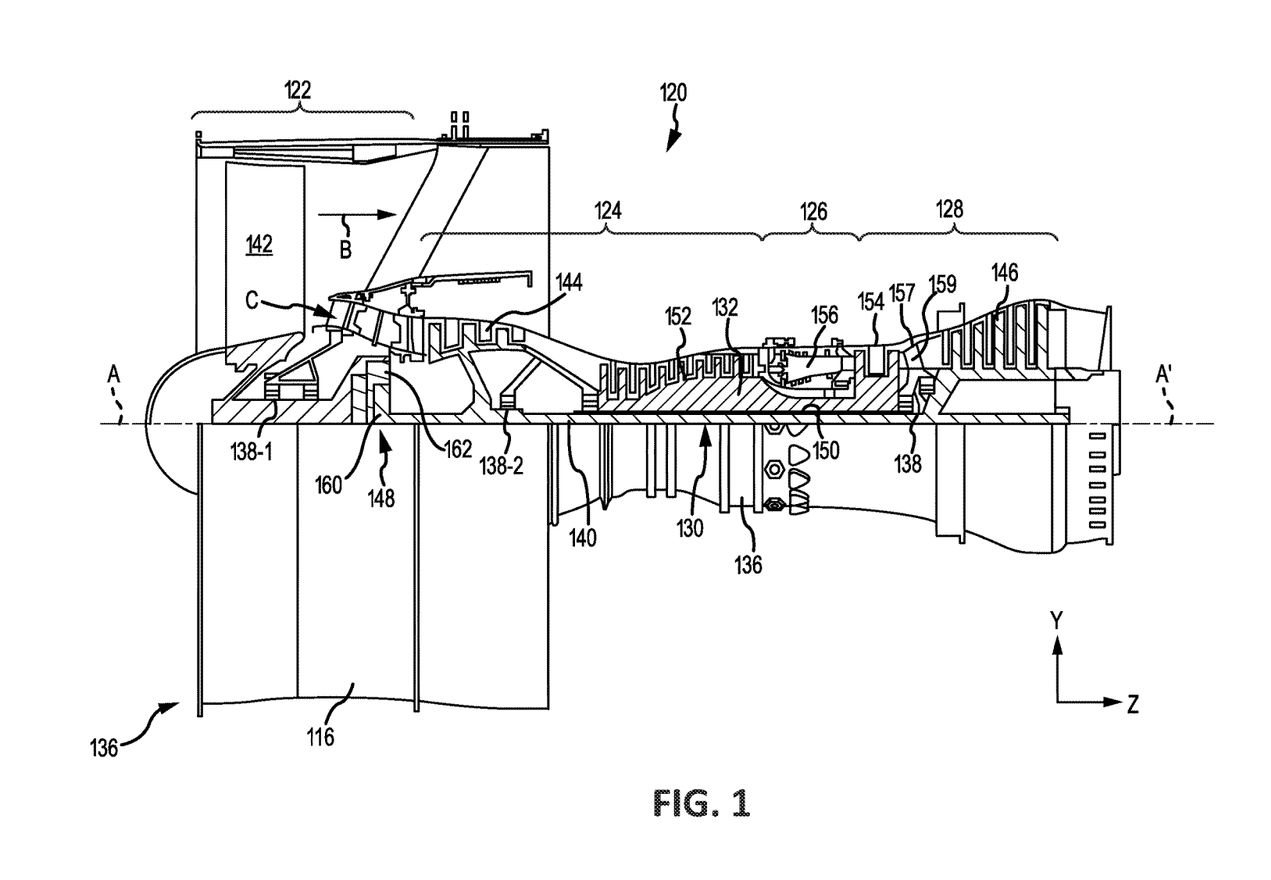
FIG. 1 illustrates a gas turbine engine, in accordance with various embodiments.

In various embodiments, and with reference to FIG. 1, a gas turbine engine 120 is disclosed. Gas turbine engine 120 may comprise a two-spool turbofan that generally incorporates a fan section 122, a compressor section 124, a combustor section 126, and a turbine section 128. Gas turbine engine 120 may also comprise, for example, an augmenter section, and/or any other suitable system, section, or feature. In operation, fan section 122 may drive air along a bypass flow-path B, while compressor section 124 may further drive air along a core flow-path C for compression and communication into combustor section 126, before expansion through turbine section 128. FIG. 1 provides a general understanding of the sections in a gas turbine engine, and is not intended to limit the disclosure. The present disclosure may extend to all types of applications and to all types of turbine engines, including, for example, such as turbojets, turboshafts, and three spool (plus fan) turbofans wherein an intermediate spool includes an intermediate pressure compressor ("IPC") between a Low Pressure Compressor ("LPC") and a High Pressure Compressor ("HPC"), and an Intermediate Pressure Turbine ("IPT") between the High Pressure Turbine ("HPT") and the Low Pressure Turbine ("LPT").

In various embodiments, gas turbine engine 120 may comprise a low speed spool 130 and a high speed spool 132 mounted for rotation about an engine central longitudinal axis A-A' relative to an engine static structure 136 via one or more bearing systems 138 (shown as, for example, bearing system 138-1 and bearing system 138-2 in FIG. 1). It should be understood that various bearing systems 138 at various locations may alternatively or additionally be provided, including, for example, bearing system 138, bearing system 138-1, and/or bearing system 138-2.

In various embodiments, low speed spool 130 may comprise an inner shaft 140 that interconnects a fan 142, a low pressure (or first) compressor section 144, and a low pressure (or first) turbine section 146. Inner shaft 140 may be connected to fan 142 through a geared architecture 148 that can drive fan 142 at a lower speed than low speed spool 130. Geared architecture 148 may comprise a gear assembly 160 enclosed within a gear housing 162. Gear assembly 160 may couple inner shaft 140 to a rotating fan structure. High speed spool 132 may comprise an outer shaft 150 that interconnects a high pressure compressor ("HPC") 152 (e.g., a second compressor section) and high pressure (or second) turbine section 154. A combustor 156 may be located between HPC 152 and high pressure turbine 154. A mid-turbine frame 157 of engine static structure 136 may be located generally between high pressure turbine 154 and low pressure turbine 146. Mid-turbine frame 157 may support one or more bearing systems 138 in turbine section 128. Inner shaft 140 and outer shaft 150 may be concentric and may rotate via bearing systems 138 about engine central longitudinal axis A-A'. As used herein, a "high pressure" compressor and/or turbine may experience a higher pressure than a corresponding "low pressure" compressor and/or turbine.

In various embodiments, the air along core airflow C may be compressed by low pressure compressor 144 and HPC 152, mixed and burned with fuel in combustor 156, and expanded over high pressure turbine 154 and low pressure turbine 146. Mid-turbine frame 157 may comprise airfoils 159 located in core airflow path C. Low pressure turbine 146 and high pressure turbine 154 may rotationally drive low speed spool 130 and high speed spool 132, respectively, in response to the expansion.

Figure 2:
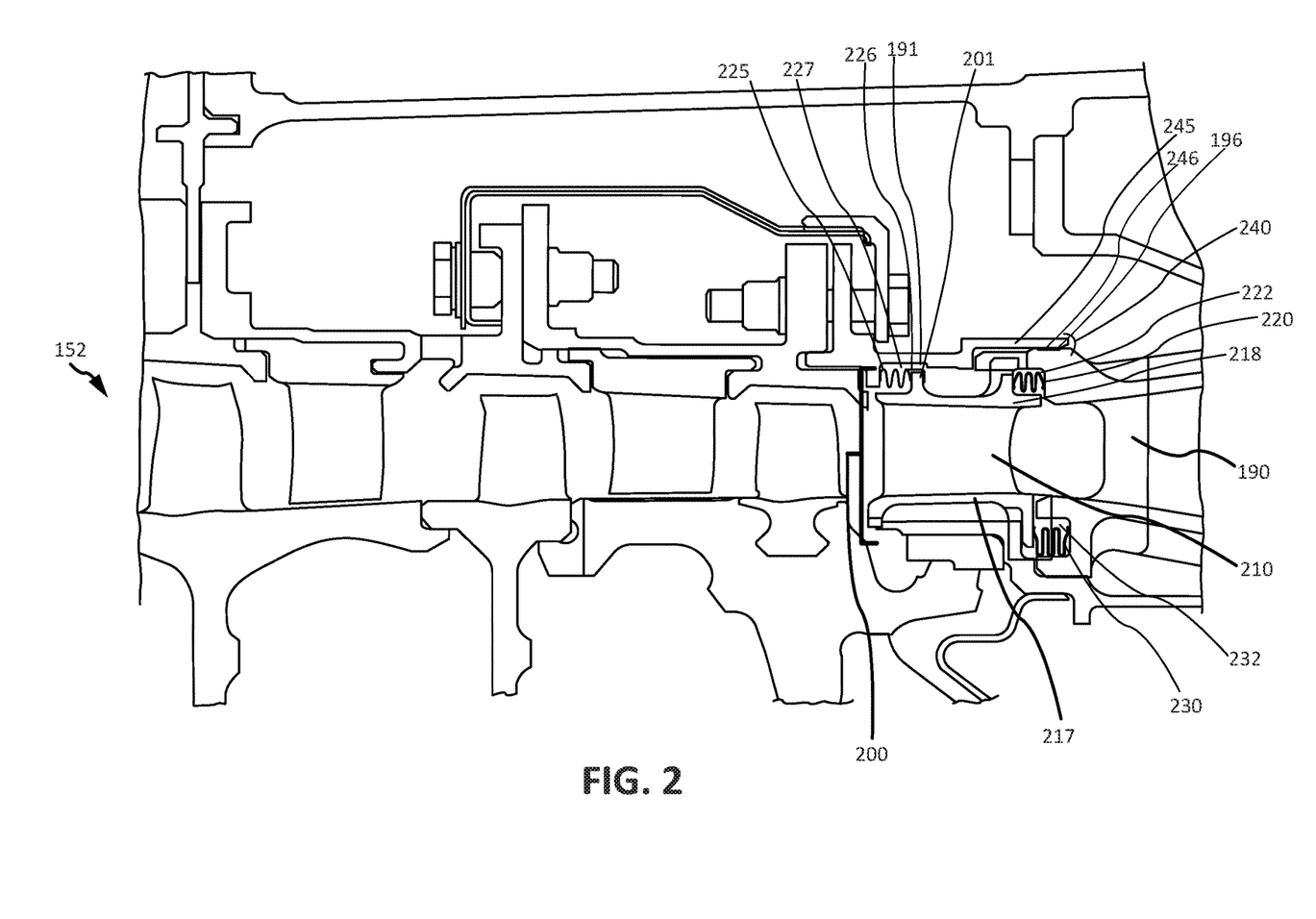
FIG. 2 illustrates a high compressor section of a gas turbine engine, in accordance with various embodiments.

In various embodiments, and with reference to FIG. 2, HPC 152 of FIG. 1 is depicted in greater detail. Inflowing air may proceed through HPC 152 and into a diffuser assembly 190. Diffuser assembly 190 may condition the inflowing compressed air by causing a decrease in velocity and an increase in pressure prior to entering combustor section 126 (with momentary reference to FIG. 1). Prior to entering diffuser assembly 190, the inflowing air may travel through a stator assembly 200, configured to define an air flow path from the last rotating HPC 152 module to diffuser assembly 190. In various embodiments, stator assembly 200 may be mounted adjacent to diffuser assembly 190, in gas turbine engine 120. Stator assembly 200 may comprise a full ring stator assembly, wherein a plurality of stator assemblies 200 may be located circumferentially around the defined airflow path.

In various embodiments, stator assembly 200 may increase pressure in HPC 152, and straighten and direct air flow. Stator assembly 200 may comprise an inner diameter (ID) ring 217 radially spaced apart from an outer diameter (OD) ring 218. In various embodiments, OD ring 218 may form a portion of an outer core engine structure, and ID ring 217 may form a portion of an inner core engine structure to at least partially define an annular core gas flow. In various embodiments, stator assembly 200 may be configured to couple to the inside of gas turbine engine 120 using any suitable method known in the art, such as, for example, via OD ring 218 and ID ring 217. For example, OD ring 218 and ID ring 217 may each comprise a tab located on a radially outward surface (from engine central longitudinal axis A-A'), configured to couple with a slot in the inside of gas turbine engine 120.

In various embodiments, an exit guide vane 210 may be coupled at a first end to OD ring 218 and coupled at a second end to ID ring 217. Exit guide vane 210 may be configured to reduce airflow swirl and direct airflow into diffuser assembly 190. In various embodiments, OD ring 218 may comprise any suitable axial diameter, such as, for example, an axial diameter of about 9.00 inches (22.8 cm) to about 18.00 inches (45.72 cm), or about 12.00 inches (30.4 cm) to about 16.00 inches (40.6 cm), or about 13.00 inches (33.2 cm) to about 15.00 inches (38.1 cm), wherein the term about in this context only means+/−0.25 inches (0.635 cm). In various embodiments, OD ring 218 may comprise an axial diameter of about 14.45 inches (36.7 cm), wherein the term about in this context only means+/−0.25 inches (0.635 cm). In various embodiments, ID ring 217 may comprise any suitable axial diameter, such as, for example, an axial diameter of about 7.00 inches (17.7 cm) to about 18.00 inches (45.72 cm), or about 10.00 inches (25.4 cm) to about 16.00 inches (40.6 cm), or about 12.00 inches (30.48 cm) to about 14.00 inches (35.56 cm), wherein the term about in this context only means+/−0.25 inches (0.635 cm). In various embodiments, ID ring 217 may comprise the axial diameter of about 13.44 inches (34.14 cm), wherein the term about in this context only means+/−0.25 inches (0.635 cm). In various embodiments, exit guide vane 210 may comprise any suitable axial diameter, such as, for example, an axial diameter at a radial midpoint of about 10.00 inches (25.4 cm) to about 18.00 inches (45.72 cm), or about 14.00 inches (35.56 cm) to about 18.00 inches (45.72 cm), wherein the term about in this context only means+/−0.25 inches (0.635 cm). In various embodiments, exit guide vane 210 may comprise the axial diameter at the radial midpoint of about 13.92 inches (35.35 cm), wherein the term about in this context only means+/−0.25 inches (0.635 cm).

In various embodiments, exit guide vane 210, ID ring 217, and OD ring 218 may comprise a single casting. In various embodiments, exit guide vane 210, ID ring 217, and OD ring 218 may comprise any suitable material, such as, for example, an age-hardenable, nickel-based superalloy.

In various embodiments, stator assembly 200 may also provide an improved seal assembly to reduce leakage (and/or airflow recirculation) along the core gas flow path. A reduction of airflow leakage (and/or airflow recirculation) may reduce turbine inlet temperatures and reduce stall margin degradation in gas turbine engine 120. In this regard, stator assembly 200 may comprise an aft OD seal 220, a forward OD seal 225, an ID seal 230, and a diffuser assembly seal 240.

In various embodiments, aft OD seal 220 may be configured to provide an improved seal along OD ring 218 to reduce airflow leakage. In this regard, aft OD seal 220 may be located where stator assembly 200 couples adjacent to diffuser assembly 190, aft exit guide vane 210. For example, aft OD seal 220 may be disposed within an aft OD annular cavity 222 adjacent to OD ring 218 and diffuser assembly 190, aft exit guide vane 210. Aft OD seal 220 may form a "W" shape, and may be biased outwardly from engine central longitudinal axis A-A' to provide an improved seal. The "W" shape may enable aft OD seal 220 to compress when placed into aft OD annular cavity 222, further improving the seal and reducing airflow leakage. Aft OD seal 220 may comprise any suitable material capable of sealing airflow, such as, for example, a nickel alloy or a nickel chromium alloy.

In various embodiments, forward OD seal 225 may be configured to provide an improved seal along OD ring 218 to reduce airflow leakage. In this regard, forward OD seal 225 may be located where stator assembly 200 couples to diffuser assembly 190, forward exit guide vane 210. For example, forward OD seal 225 may be disposed where a tab 201 of stator assembly 200 couples to a slot 191 of diffuser assembly 190. In that regard, forward OD seal 225 may be disposed within a forward OD annular cavity 227 adjacent to OD ring 218 and diffuser assembly 190, forward of exit guide vane 210. Forward OD seal 225 may form a "W" shape, and may be biased outwardly from engine central longitudinal axis A-A' to provide an improved seal. The "W" shape may enable forward OD seal 225 to compress when placed into forward OD annular cavity 227, further improving the seal and reducing airflow leakage. Forward OD seal 225 may comprise any suitable material capable of sealing airflow, such as, for example, a nickel alloy or a nickel chromium alloy.

In various embodiments, forward OD seal 225 may be configured to allow for a blind assembly of gas turbine engine 120. During installation of stator assembly 200 into gas turbine engine 120, forward OD seal 225 may be placed onto stator assembly 200 prior to installation of exit guide vane 210. In that regard, forward OD seal 225 may comprise a retention feature 226 enabling forward OD seal 225 to affix to stator assembly 200 during blind assembly of gas turbine engine 120. For example, retention feature 226 may affix to tab 201 of OD ring 218. Retention feature 226 may therefore enable forward OD seal 225 to remain affixed to stator assembly 200 during the blind assembly of stator assembly 200 in gas turbine engine 120.

In various embodiments, ID seal 230 may be configured to provide an improved seal along ID ring 217 to reduce airflow leakage. In this regard, ID seal 230 may be located where stator assembly 200 couples to diffuser assembly 190. For example, ID seal 230 may be disposed within an ID annular cavity 232 adjacent to ID ring 217 and diffuser assembly 190, aft exit guide vane 210. ID seal 230 may form a "W" shape, and may be biased outwardly from engine central longitudinal axis A-A' to provide an improved seal. The "W" shape may enable ID seal 230 to compress when placed into ID annular cavity 232, thus further improving the seal and reducing airflow leakage. ID seal 230 may comprise any suitable material capable of sealing airflow, such as, for example, a nickel alloy or a nickel chromium alloy.

In various embodiments, diffuser assembly seal 240 may be configured to provide an additional seal against airflow leakage. In this regard, diffuser assembly seal 240 may be located between a coupling of an aft ring 245 to diffuser assembly 190. Diffuser assembly seal 240 may provide an additional mechanism to seal airflow leakage in response to air leaking through aft OD seal 220. In various embodiments, diffuser assembly seal 240 may comprise a "snap seal." In that regard, aft ring 245 may comprise a tab 246, and/or the like, configured to tightly fit within a corresponding slot 196 of diffuser assembly 190. In response to tab 246 being within corresponding slot 196, diffuser assembly seal 240 may create a "snap seal" to prevent airflow leakage.

Figure 3:
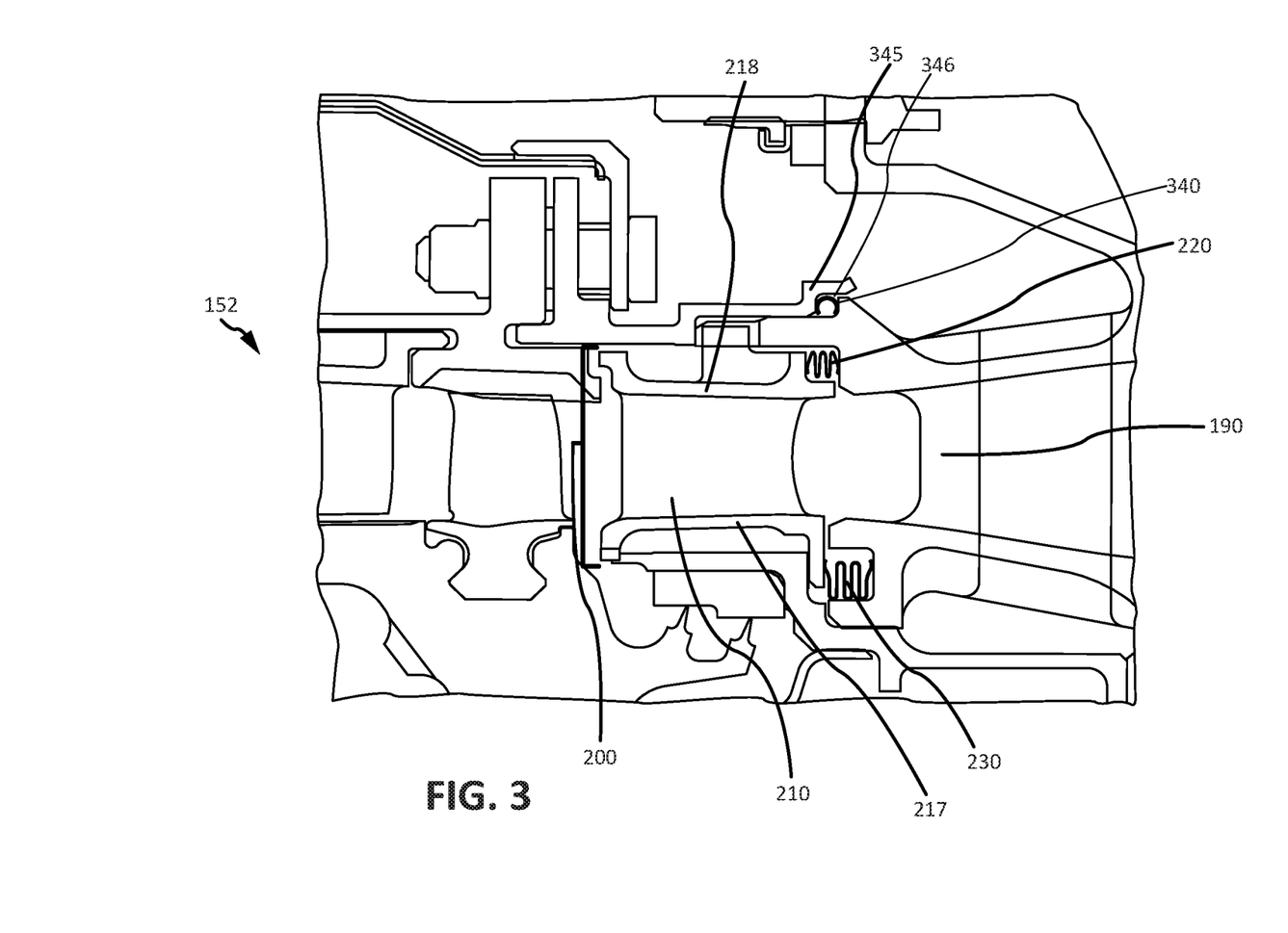
FIG. 3 illustrates a high compressor section of a gas turbine engine, in accordance with various embodiments.

In various embodiments, and with reference to FIG. 3, diffuser assembly seal 340 may also comprise a "C" shaped seal, and may be biased outwardly from engine central longitudinal axis A-A' to provide an improved seal. In this regard, diffuser assembly seal 340 may be configured to fit within an annular cavity 346 between aft ring 345 and diffuser assembly 190. Diffuser assembly seal 340 may comprise any suitable material capable of sealing airflow, such as, for example, a nickel alloy or a nickel chromium alloy.

Figure 4:
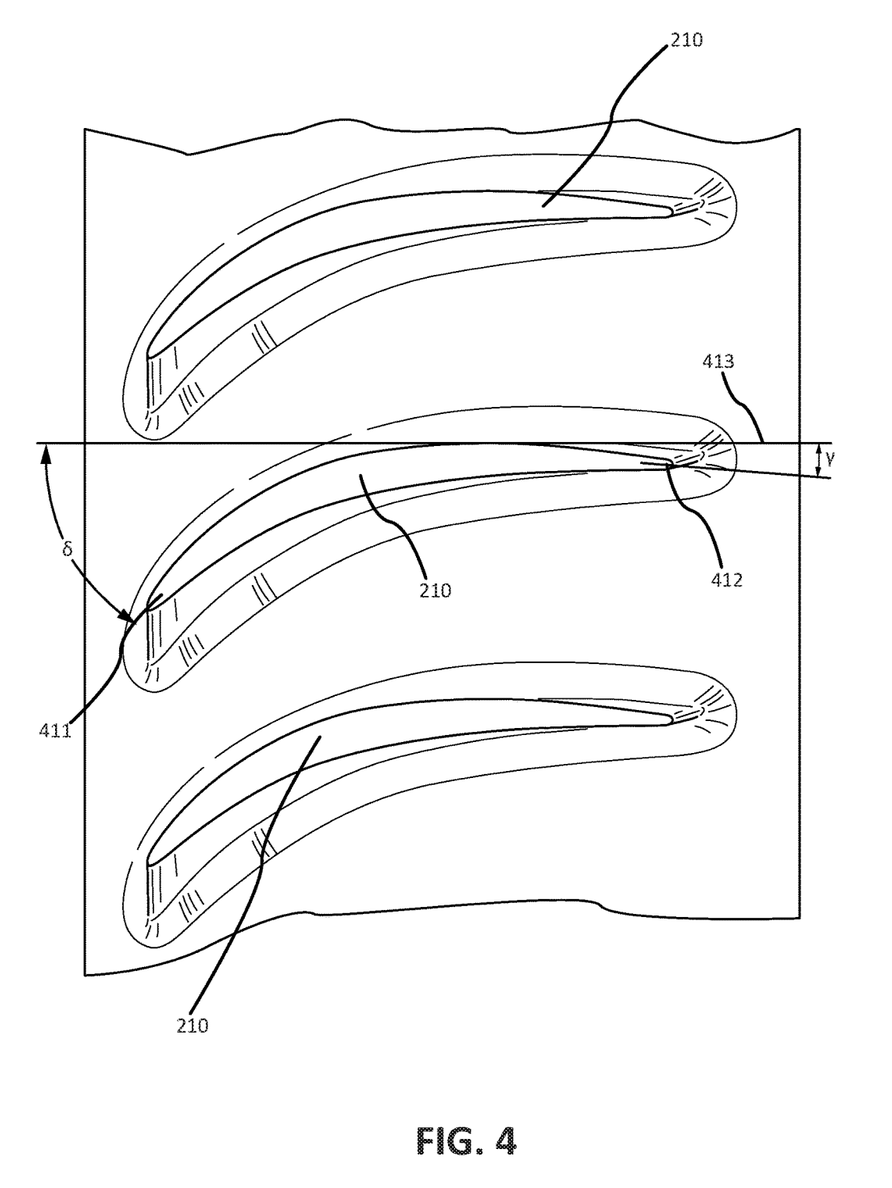
FIG. 4 illustrates a perspective cross-section view of an exit guide vane, in accordance with various embodiments.

In various embodiments, and with reference to FIG. 4, exit guide vane 210 is depicted in greater detail. Exit guide vane 210 may comprise a body having a leading edge 411 and a trailing edge 412. Leading edge 411 may comprise an axially forward edge of exit guide vane 210, configured to direct the inflowing air aft exit guide vane 210. Trailing edge 412 may comprise an axial edge opposite of leading edge 411, on the axially aft edge of exit guide vane 210, configured to guide the inflowing air aft exit guide vane 210 and towards diffuser assembly 190. In various embodiments, leading edge 411 and trailing edge 412 may be oriented relative to an axis 413. Axis 413 may comprise an outer side of exit guide vane 210, located between leading edge 411 and trailing edge 412, from which leading edge 411 and trailing edge 412 are oriented axially away from.

In that regard, and in various embodiments, leading edge 411 may be oriented at a leading edge angle delta ("$\delta$") relative to axis 413. Leading edge angle $\delta$ of leading edge 411 relative to axis 413 may be about 44° to about 64°, or about 54° to about 64° (wherein about in this context means+/−1°). In various embodiments, leading edge angle $\delta$ may be 54°. In various embodiments, trailing edge 412 may be oriented at a trailing edge angle gamma ("$\gamma$") relative to axis 413. Trailing edge angle $\gamma$ of trailing edge 412 relative to axis 413 may be about 1° to about 15°, or about 8° to about 15° (wherein about in this context means+/−1°). In various embodiments, trailing edge angle $\gamma$ may be 5°.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A stator assembly for a high pressure compressor section of a gas turbine engine, comprising:
    an OD ring having a front edge and an aft edge, wherein the OD ring comprises a tab located proximate the front edge;
    an exit guide vane coupled to the OD ring, wherein the exit guide vane comprises:
        a leading edge;
        a trailing edge axially opposite of the leading edge; and
        an axis located between the leading edge and the trailing edge, wherein the leading edge is oriented at an angle of about 44° to about 64° relative to the axis, and wherein the trailing edge is oriented at an angle of about 1° to about 15° relative to the axis;
    an ID ring having a front end and an aft end, wherein the ID ring is coupled to the exit guide vane;
    a forward OD seal located at the front edge of the OD ring, the forward OD seal comprising a retention feature affixed to the tab of the OD ring, wherein the forward OD seal comprises a W shape;
    an ID seal located at the aft end of the ID ring;
    an aft ring located radially outward of the aft edge of the OD ring, wherein the aft ring extends, at least, from the aft edge of the OD ring to the front edge of the OD ring, and wherein a radially inward facing surface of the aft ring includes a second tab protruding radially inward from the radially inward facing surface;
    a diffuser assembly located aft of the exit guide vane, wherein the ID seal is compressed between the ID ring and the diffuser assembly, and wherein the second tab of the aft ring is located in a radially inward extending slot defined by the diffuser assembly such that the second tab forms a snap seal with the diffuser assembly; and
    an aft OD seal compressed between the OD ring and the diffuser assembly, the aft OD seal being radially inward from the snap seal.

2. The stator assembly of claim 1, wherein the leading edge is oriented at an angle of about 52° to about 56° relative to the axis, and wherein the trailing edge is oriented at an angle of about 3° to about 7° relative to the axis.

3. The stator assembly of claim 1, wherein the OD ring comprises a diameter of about 9 inches to about 18 inches, and wherein the ID ring comprises a diameter of about 7 inches to about 18 inches.

4. The stator assembly of claim 1, wherein the ID ring comprises a diameter of about 13.34 inches to about 13.54 inches, and wherein the OD ring comprises a diameter of about 14.35 to about 14.55.

5. A gas turbine engine, comprising:
a compressor section;
a diffuser assembly located aft of the compressor section; and
a stator assembly in the compressor section and located immediately forward the diffuser assembly, the stator assembly comprising:
an OD ring;
an exit guide vane coupled to the OD ring, wherein the exit guide vane is located immediately forward of the diffuser assembly, and wherein the exit guide vane comprises:
a leading edge;
a trailing edge axially opposite of the leading edge; and
an axis located between the leading edge and the trailing edge, wherein the leading edge is oriented at an angle of about 44° to about 64° relative to the axis, and wherein the trailing edge is oriented at an angle of about 1° to about 15° relative to the axis;
an ID ring coupled to the exit guide vane; and
an aft ring located radially outward of the OD ring, wherein the aft ring extends, at least, from an aft edge of the OD ring to a front edge of the OD ring;
an ID seal compressed between the ID ring and the diffuser assembly;
an OD seal compressed between the OD ring and the diffuser assembly; and
a diffuser seal located in a cavity defined by the aft ring and the diffuser assembly, wherein the diffuser seal contacts the diffuser assembly and the aft ring, the diffuser seal being located radially outward from the OD seal.

6. The gas turbine engine of claim 5, further comprising a forward OD seal located at the front edge of the OD ring, wherein the forward OD seal comprises a retention feature configured to couple the forward OD seal to a tab extending from the OD ring.

7. The gas turbine engine of claim 5, wherein the OD ring comprises a diameter of about 14.35 inches to about 14.55 inches, the ID ring comprises a diameter of about 13.34 inches to about 13.54 inches, the leading edge is oriented at an angle of about 52° to about 56° relative to the axis, and the trailing edge is oriented at an angle of about 3° to about 7° relative to the axis.

* * * * *